Dec. 3, 1935.  J. J. GALLIGAN ET AL  2,022,852
METHOD OF CRINKLING OR PUCKERING ELASTIC MATERIAL
Filed July 1, 1935
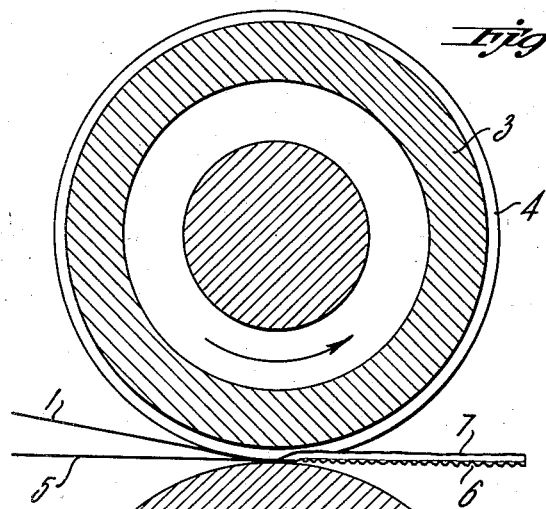
Fig. 1.
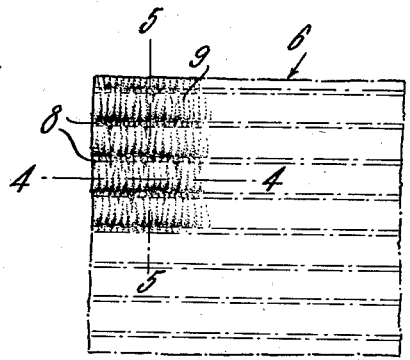
Fig. 2.
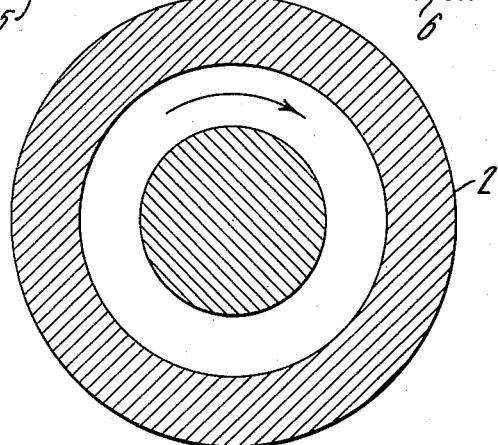
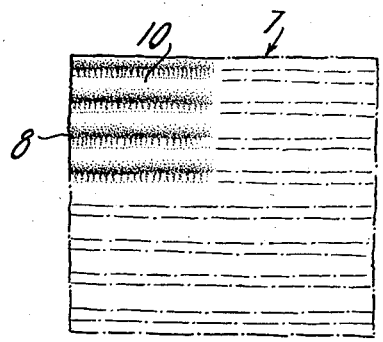
Fig. 3.
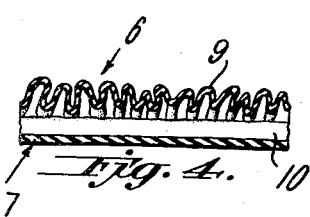
Fig. 4.
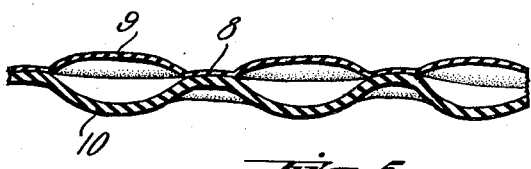
Fig. 5.
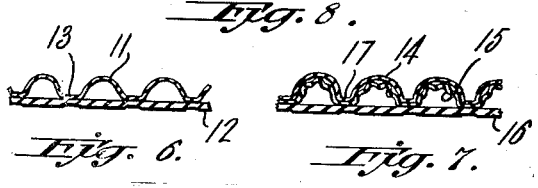
Fig. 8.
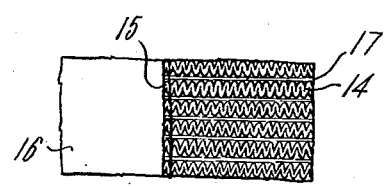
Fig. 6.   Fig. 7.
INVENTORS
JAMES J. GALLIGAN
WILLIAM J. ROBINSON
BY
ATTORNEY.

Patented Dec. 3, 1935

2,022,852

UNITED STATES PATENT OFFICE 2,022,852

METHOD OF CRINKLING OR PUCKERING ELASTIC MATERIAL

James J. Galligan and William J. Robinson, Providence, R. I., assignors to United States Rubber Products Inc., New York, N. Y., a corporation of Delaware Application July 1, 1935, Serial No. 29,416

21 Claims. (Cl. 154—33)

This invention relates to a method of making crinkled or puckered elastic material, more particularly to the making of a crinkled rubber-like material which is outwardly crinkled on at least one side and if desired on both sides.

The present application is a continuation-in-part of our applications Serial No. 614,172 filed May 28, 1932 and Serial No. 631,313 filed September 1, 1932.

In the rubber industry, in the manufacture of various articles such as bathing suits, bathing caps, belts, bags, etc., one of the greatest essentials in the trade, in addition to desired utilitarian properties, is a highly ornamental and novel appearance in the rubber stock used, and it is also desirable that the appearance be easily varied. Such properties and appearance can be obtained by crinkling or puckering sheet rubber in various designs.

An object of our invention is to provide a method for crinkling or puckering sheet rubber stock or like material.

Another object is to provide a method for crinkling sheet rubber stock which is applicable for the making of a single ply or a multi-ply material.

Another object is to provide a method of crinkling rubber which, by slightly varying the conditions under which it is carried out, may produce crinkled materials of different appearance.

Other objects will appear from a consideration of the detailed description, claims and drawing, in which latter:

Fig. 1 is a sectional view of a pair of pressure rolls forming one means for carrying out the invention;

Fig. 2 is an enlarged top view of one form of a two-ply material;

Fig. 3 is a similarly enlarged view of the bottom of a two-ply material;

Fig. 4 is an enlarged section on the line 4—4 of Fig. 2;

Fig. 5 is an enlarged section on the line 5—5 of Fig. 2;

Fig. 6 is a section showing an intermediate stage in the making of a single ply crinkled material by the method;

Fig. 7 is a section at an intermediate stage similar to Fig. 6, but for making a two-ply material; and Fig. 8 is a plan view of the material shown in Fig. 7.

By varying the conditions and apparatus to some degree in carrying out the method, it may be applied to the making of single or multiple ply crinkled rubber materials having widely different appearance, and there will first be described an application of the method for the making of a crinkled material composed of two or more plies of unvulcanized rubber.

Referring to Fig. 1 of the drawing, there are shown in section a pair of cooperating even speed rolls which are suitable for carrying out the invention, the drive mechanism and other details of the apparatus being omitted for the sake of clearness. The apparatus is shown and described in detail in our copending application Serial No. 29,415 filed July 1, 1935, and the apparatus shown in our copending application Serial No. 614,172, filed May 28, 1932, may also be used.

In carrying out one embodiment of the method, a backing sheet 1 of unvulcanized rubber of any suitable type is fed, under tension sufficient to appreciably stretch it longitudinally, between a smooth roll 2 and a cooperating even speed roll 3 provided, in the embodiment shown, with projecting relatively closely spaced narrow circumferential ridges 4 but as later pointed out many other forms of projections may be used. Simultaneously with the longitudinal stretch of the sheet, there is a certain amount of transverse contraction. Coincidentally with the feeding of the stretched sheet, there is fed in between the rolls a second sheet 5 of unvulcanized rubber in an unstretched condition. Due to the pressure between the projections 4 on the one roll and the cooperating areas on the smooth roll 2, the unstretched sheet of raw rubber is adhesively united to the stretched sheet at the points where pressure is exerted. As the two sheets emerge from between the bite of the rolls, the tension on the stretched sheet is released, thereby causing it to contract in length and expand in width more or less, and this contraction causes those intervening portions of the unstretched sheet which have not been attached by pressure of the concentric ridges 4 to pucker up or crinkle, while apparently the tendency of the stretched sheet to expand laterally after it is released is resisted by the crinkled unstretched sheet, and the stretched sheet is buckled and forms longitudinal puckers, unless its tensile strength and resiliency are great enough to overcome the action of the unstretched sheet, as will later be pointed out in detail.

It should be understood that while in the preparation of crude rubber by the milling operation, its elasticity has been temporarily destroyed to a considerable extent in order to render it plastic enough for calendering, at the same time the calendered sheet when it has cooled recovers sufficient elasticity to enable it to be stretched to some extent and to then contract when the tension is released. It will, of course, be understood that when carrying out the above form of the process, the tension on the unvulcanized stretched sheet will not be sufficient to rupture or unduly extend it.

As a result of the above steps, the composite sheet thus produced is crinkled outwardly on the side where the unstretched sheet was disposed, and it may be also crinkled outwardly on the opposite or stretched side under certain conditions. If the projections on the one roll are in the form of circumferential spaced narrow ridges, as above described, the opposite sides of the composite crinkled sheet will usually appear with spaced, more or less broken and slightly crinkled narrow joint areas or lines at the points where the pressure exerted by the ridges has united the sheets. Between these joint lines or areas in the case of the unstretched sheet, the free portions will be crinkled or puckered up in the form of longitudinal rows of short, more or less irregular puckers which in general extend transversely between adjacent spaced joint lines, but these puckers may also extend in reduced size across the joint lines. In the case of the stretched sheet, there may appear substantially continuous longitudinal puckers or corrugations between the spaced joint lines, but the extent of the puckering, that is the height and other characteristics of the longitudinal puckers, will depend to a considerable extent upon the character of the stretched sheet. If the stretched sheet is not too thick and its resiliency and tensile strength are not too great, it will pucker up into longitudinal puckers or corrugations. However, if it is relatively strong and resilient, as by reason of its thickness, or vulcanization, or the use of a stiffer and stronger rubber stock, it may have sufficient resistance to the puckering effect of the other sheet to remain substantially flat, with merely spaced joint lines showing where portions of it have been joined by the pressure of the rolls to the other sheet.

In Figs. 2 to 5 of the drawing there is illustrated on a much enlarged scale a two-ply crinkled material made according to the process of the invention, and in which the union of two vulcanizable plies was accomplished by means of a smooth roll and a cooperating even speed roll provided with evenly spaced circumferential ridges of the character shown in Fig. 1. In the figures the numeral 6 designates generally the sheet at one side of the crinkled material which is ordinarily the top surface in a finished article, and the numeral 7 the backing or opposite sheet. At 3 are indicated the joint lines or narrow areas along which the two sheets have been adhesively united by the pressure between the ridged and plain rolls. As before pointed out, these joint lines or areas are more or less broken up, by reason of small crinkles produced in them by the adjacent crinkles in the free portions of the material. Another reason for irregularity in the joint lines may be a slight slippage of the rubber stock at the point of pressure between the two rolls, due to the stretching of the one sheet in rear of the rolls and its release in front of them. In the material illustrated the sheet 7 is the one which was under tension and in contact with the ridges 4 of the roll 3, while the sheet 6 was not under tension during passage through the rolls. As will be seen from Fig. 2 of the drawing, the sheet 6 appears with longitudinally extending rows of short transverse puckers 9 of more or less irregular size, height, width and length disposed between adjacent joint lines 8, while directly below the rows of transverse puckers 9 and between the joint lines 8, the lower sheet has continuous longitudinal puckers 10, each longitudinal pucker being disposed directly below a row of the small transverse puckers 9.

The crinkled sheet thus produced may then be vulcanized to permanently set it, if a sheet material is desired, and the vulcanized material may afterwards be made up into articles or used in its sheet form. On the other hand, the vulcanizable crinkled sheet may be cut up and directly assembled into various articles such as bathing suits, caps and shoes, aprons, etc., and the finished articles then vulcanized to a degree suitable for their intended use. There is an advantage in so making up articles from unvulcanized crinkled material, because the scrap produced by cutting can be reused by merely remilling with fresh stock and calendering, and there is a further advantage that in assembling articles from the cut pieces of the unvulcanized crinkled material, the parts may be united merely by pressure.

In feeding the sheets between the pressure rolls, the tensioned or stretched sheet may be disposed either in contact with the smooth roll or in contact with the roll having the projections, but the latter method of feeding is preferred. It is also preferred to use for the sheet which is under tension a somewhat heavier gauge stock than the unstretched sheet.

Instead of using only two sheets, more may be used, and in this case an interior sheet of the superposed plies will be the one to be placed under tension when passing through the crinkling rolls.

Also, it is not essential in carrying out the method that all of the sheets be entirely unvulcanized, and instead, one or more or all of the sheets may be lightly vulcanized, provided that the vulcanization is not carried to a point sufficient to seriously affect the adhesiveness and/or other desired characteristics of the stocks.

If a sheet be vulcanized to a substantial extent, its ability to adhere by pressure alone is too greatly reduced for the making of a permanent connection, and at the same time its elasticity and strength are increased to a point where it will remain flat and not pucker when joined to a raw or less vulcanized sheet. These properties are taken advantage of in the making of a single ply crinkled sheet, as will be later explained.

If an unvulcanized sheet be used with one which is lightly vulcanized, then preferably the lightly vulcanized sheet is the one which is to be placed under tension when uniting the two, and if two or more lightly vulcanized sheets are to be united, the one which is to be placed under tension preferably should be vulcanized to a greater degree than the remaining sheets.

It is obvious that the gauge of the stocks to be used may be varied to suit conditions and according to the pattern desired, but for some purposes, as in carrying out the form of the method first given, it has been found that a gauge of .0045 inch is suitable for the unstretched sheet, and a gauge of .008 inch for the stretched sheet. The crinkled design produced on either or both sides of a two or more ply material may be widely varied by varying any part or all of the following conditions: pressure between the rolls, gauge of stock, character of the rubber stock, use of unvulcanized rubber and/or rubber of varying degrees of light vulcanization, number of plies, tension, variation in the shape, effective pressure area, arrangement and spacing of the roll projections, and by uniting the sheets with the tensioned or backing sheet in contact with either the smooth roll or the roll having the projections.

A suitable method of vulcanizing the crinkled stock is by the vapor cure using sulphur chloride. This method has the advantage of simplicity, cheap equipment, and it does not cause dulling or dimming of bright colored stocks. Moreover, it permits the ready use of varying degrees of light cure in those cases where a slightly vulcanized stock is to be employed in making the crinkled rubber. However, any other suitable method of vulcanization may be employed, particularly those utilizing modern high powered low-temperature accelerators of vulcanization. There may also be employed the diffusion method of vulcanization disclosed in patent to Cadwell, No. 1,777,960, dated October 7, 1930, by which method the rubber stocks may be compounded with a portion of the vulcanizing ingredients and the balance of the vulcanizing combination introduced by diffusion from the surface, or the stock for one ply may be compounded with a portion of the vulcanizing ingredients, and the stock of the remaining ply or plies compounded with the complementary vulcanizing ingredients required to complete the combination. These alternative methods of vulcanization have an advantage over the sulphur chloride cure in that in general they produce a stock of better aging qualities. It will be understood that in the case where the sulphur monochloride cure is used, it is unnecessary to include any vulcanizing ingredients in the rubber stock, since vulcanization is accomplished entirely by diffusion of the sulphur chloride into the rubber stock.

The invention is also applicable to the making of a single ply crinkled rubber material.

In carrying out the invention for the production of a single ply crinkled material, the method in general is the same as that used previously, but there is used for the stretched ply which forms a supporting or backing member a sheet of rubber of somewhat heavier gauge and one which has been vulcanized to a substantial extent sufficient to destroy its tackiness to such a degree that it will no longer become permanently and strongly united to another ply of rubber by the action of the pressure rolls, and at the same time its stiffness or resiliency and tensile strength are so great that it does not become crinkled itself. This relatively highly vulcanized sheet in a stretched condition is passed between the rolls 2 and 3 along with a sheet of unvulcanized rubber in an unstretched condition, and upon issuing from between the rolls, the sheet of unvulcanized rubber 11 (Fig. 6) will be lightly adhesively united to the sheet of relatively highly vulcanized rubber 12, the unstretched unvulcanized sheet becoming crinkled, while the stretched substantially vulcanized sheet does not crinkle by reason of its strength and resiliency, the narrow lines or areas where pressure was exerted by the rolls being indicated at 13. The assembly thus produced is subjected to a relatively light cure by the use of sulphur monochloride for instance, the cure applied being just sufficient to set the crinkled unvulcanized sheet of the assembly. As before pointed out, the stretched sheet used has been already vulcanized to such an extent that it will not strongly and permanently unite with another sheet of rubber by the aid of pressure alone, and as a result the set crinkled sheet which has been given a light cure may be stripped off from the vulcanized backing sheet. In this manner there will be produced a single ply of crinkled rubber sheet material, which may then be cut up and formed into desired articles, such as bathing caps, etc., and the finished articles may then be given an additional cure as by the use of sulphur chloride vapor to the desired point of vulcanization for the intended use. The vulcanized backing sheet may be used a number of times, but obviously after each use it will have acquired a slightly higher state of vulcanization, and ultimately it will become vulcanized to such an extent as to be unfit for the purpose, when it may be discarded and a new backing sheet substituted.

In this form of the invention a two-ply crinkled material may also be produced by using two adjoining unstretched sheets of unvulcanized rubber in connection with the stretched backing sheet of vulcanized rubber, the assembly after passing through the rolls being given a light cure by sulphur chloride, and the two superposed lightly cured and permanently united crinkled sheets being then stripped from the backing sheet as when making the single ply material.

Referring to Fig. 7, there is shown more or less diagrammatically the modified two ply construction at an intermediate stage, after passing through the pressure rolls and before stripping off the stretched vulcanized ply. The numerals 14 and 15 designate the two unstretched sheets of unvulcanized rubber, 16 the previously stretched vulcanized ply or backing sheet, and 17 the narrow joint lines or pressure areas. In Fig. 8 there is shown a plan view of a two ply material before stripping off the backing sheet 16. The single ply material shown in section in Fig. 6 has a surface appearance similar to that shown in Fig. 8.

When making either a single or a two ply crinkled material by the procedure last described, the character of the crinkling may be widely varied by change in the roll projections, pressure between the rolls, gauge of stock, etc., as in the case of the modification first described.

The essentials of the invention are the uniting, permanently or temporarily, of a stretched and an unstretched sheet of rubber-like material by pressure while superposed, at closely spaced small areas, and releasing the composite material to allow the stretched sheet to contract, thereby causing the intermediate free portions of one or both sheets to crinkle or pucker.

Where the term "vulcanizable" is applied to a rubber stock in this specification, it is intended to comprehend a stock having no vulcanizing ingredients therein, or an unvulcanized stock which contains vulcanizing ingredients, or a stock which has been lightly vulcanized and which is capable of still further vulcanization before assuming the condition which in the rubber art would be considered as substantially or fully vulcanized for the finished article.

In place of rubber, it is obvious that any rubber substitute or synthetic rubber having the desired properties may be used, and the term "rubber", as broadly used, is intended to comprehend such materials.

By plying up a desired number of sheets of the crinkled material, there may be obtained a relatively thick material of great lightness and high resiliency, similar in general properties to sponge rubber, and such material is capable of wide use as a shock or sound deadener or for insulating purposes.

By the method of the invention there is produced a crinkled or puckered article of high utility and ornamental appearance which may be crinkled on one side and substantially smooth on the other, or it may be crinkled on both sides. The material is very light for its bulk, and it is very flexible, elastic and resilient. By using different colored sheet stocks, a contrasting color appearance, as well as a contrasting design, may be obtained on opposite sides of the finished material. The material is applicable to a wide number of uses, such as bathing caps, bathing suits, bathing shoes, belts, bags, armlets, and beach wear generally. It is also capable of use for aprons, baby pants, footwear, doilies, table covers, pillow covers, wash cloths, etc.

While specific embodiments of the invention have been shown and described, it is obvious that it is capable of wide variations and it is not desired to limit it otherwise than is required by the prior art and as set forth in the appended claims.

Having thus described our invention, what we claim and desire to protect by Letters Patent is:

1. The method which comprises superposing plies of rubber, one of said plies being under tension, adhesively uniting said plies by pressure on closely spaced areas thereof, leaving the intermediate portions of the plies free of attachment to each other, releasing the tension on said tensioned ply to cause crinkling or puckering of the composite material, and subjecting the assembly to a vulcanizing treatment.

2. The method of making a crinkled elastic material which comprises superposing plies of elastic material, one of said plies being under tension, adhesively uniting said plies on predetermined spaced areas by pressure, releasing the tension to thereby pucker the composite material between the united areas, and permanently uniting and setting the puckered plies.

3. The method of making crinkled rubber which comprises superposing plies of vulcanizable rubber, one of said plies being under tension, adhesively uniting said plies on predetermined spaced areas by pressure, releasing the tension to pucker the intermediate areas of the composite material and vulcanizing the plies into permanent union at said spaced areas.

4. The method of making crinkled rubber which comprises superposing plies of unvulcanized rubber, one of said plies being under tension, adhesively uniting said plies on closely spaced areas by pressure, releasing the tension, forming an article from the united material, and vulcanizing.

5. The method of making crinkled rubber which comprises superposing plies of soft rubber, one of which has a greater degree of vulcanization than the remainder and is under tension, adhesively uniting said plies on closely spaced areas by pressure, releasing the tension to cause puckering or crinkling, and subjecting the assembly to a vulcanizing treatment.

6. The method of making crinkled rubber which comprises superposing a ply of unvulcanized rubber and a ply of lightly vulcanized rubber, said last ply being under tension, adhesively uniting said plies on predetermined small areas by pressure, releasing the tension, and vulcanizing the plies into permanent union.

7. The method of making crinkled rubber which comprises interposing a ply of lightly vulcanized rubber between rubber plies of a less degree of vulcanization, said first ply being under tension, adhesively uniting the plies on closely spaced areas by pressure, releasing the tension, and vulcanizing the plies into permanent union.

8. The method of making crinkled rubber which comprises superposing plies of vulcanizable rubber, one of said plies being under tension and of heavier gauge than the remainder, adhesively uniting said plies on predetermined areas by pressure, releasing the tension, and vulcanizing the plies into permanent union.

9. The method of making crinkled rubber which comprises superposing plies of unvulcanized rubber, one of said plies being under tension and of heavier gauge than the remainder, adhesively uniting said plies on closely spaced narrow longitudinal areas by pressure, releasing the tension, and vulcanizing the plies into permanent union.

10. That method of manufacturing a sheet of elastic material in a crinkled form which includes applying a sheet of elastic material in a plastic condition to a stretched supporting member and adhering the elastic material in a plastic condition to the stretched supporting member at a plurality of closely spaced small areas over its entire surface, with the intervening portions of the elastic sheet unconnected to the supporting member, relaxing the stretched supporting member to wrinkle the unconnected portions of the sheet of elastic material in a plastic condition intermediate said areas of adhesion, and setting the sheet of elastic material in such crinkled condition to permanently retain such shape under normal conditions.

11. That method of manufacturing a sheet of elastic material in a crinkled form which includes applying a sheet of elastic material in a plastic condition to a stretched supporting member and temporarily adhering the elastic material in a plastic condition to the stretched supporting member at a plurality of closely spaced substantially parallel zones extending over the entire sheet, relaxing the stretched supporting member and wrinkling the sheet of elastic material in a plastic condition intermediate said parallel zones of adhesion, setting the sheet of elastic material in such crinkled condition to permanently retain such shape under normal conditions, and removing the set elastic material from the supporting member.

12. That method of manufacturing vulcanizable rubber composition in sheet form with portions of its surface in a crinkled condition which includes, applying a sheet of vulcanizable rubber composition to a supporting member while said supporting member is stretched in one direction and uniting the vulcanizable rubber composition temporarily to the supporting member over its entire extent along spaced areas in parallelism with the direction in which the supporting member is stretched, with unconnected areas between said united areas, and relieving the supporting member of tension whereby the vulcanizable rubber composition is crinkled intermediate such united areas, and subsequently vulcanizing the rubber composition.

13. That method of manufacturing vulcanizable rubber composition in sheet form with portions of its surface in a crinkled condition which includes, applying a sheet of vulcanizable rubber composition to a supporting member while said supporting member is stretched in one direction and uniting the vulcanizable rubber composition temporarily to the supporting member at spaced intervals over its entire area in parallelism with the direction in which the supporting member is stretched, the portions of said sheet between said united intervals being unconnected to said supporting member, and relieving the supporting member of tension whereby the vulcanizable rubber composition is crinkled intermediate such intervals, subsequently vulcanizing the rubber composition, removing it from the supporting member, and making it up into the desired article.

14. In the method of crinkling sheet rubber, the steps comprising stretching a resilient backing, attaching sheet rubber to said backing at a plurality of closely spaced small areas distributed over the entire sheet of rubber, and relieving the tension on said backing to permit the backing to contract and crinkle the free portions of the sheet rubber.

15. In the method of crinkling sheet rubber, the steps comprising stretching a resilient backing, attaching sheet rubber to said backing at a plurality of closely spaced small areas transversely of the sheet rubber, and relieving the tension on said backing to permit the backing to contract and crinkle the free portions of the sheet rubber.

16. In the method of crinkling sheet rubber, the steps comprising stretching a resilient backing, attaching sheet rubber to said backing along lines extending longitudinally of the sheet rubber at a plurality of closely spaced areas, and relieving the tension on said backing to permit the backing to contract and crinkle the free portions of the sheet rubber.

17. In the method of crinkling sheet rubber, the steps comprising stretching a resilient backing, a temporarily attaching sheet rubber to said backing at a plurality of closely spaced small areas distributed over the entire sheet of rubber, relieving the tension on said backing to permit the backing to contract and crinkle the free portions of the sheet rubber, partially curing the sheet rubber while attached to said backing, and stripping the crinkled sheet rubber from the backing.

18. In the method of crinkling sheet rubber, the steps comprising stretching a backing of partially cured rubber, causing uncured sheet rubber to adhere to said stretched backing at a plurality of closely spaced small areas distributed over substantially the entire sheet of rubber, and relieving the tension on said backing to permit it to contract and crinkle the free portions of the uncured sheet rubber.

19. In the method of crinkling sheet rubber, the steps comprising stretching a backing of partially cured rubber, causing uncured sheet rubber to temporarily adhere to said stretched backing at a plurality of closely spaced small areas distributed over substantially the entire sheet of rubber, relieving the tension on said backing to permit it to contract and crinkle the free portions of the uncured sheet rubber, partially curing the crinkled sheet rubber while on the backing, and stripping the crinkled rubber from the backing.

20. In the method of crinkling sheet rubber, the steps comprising stretching a resilient backing, causing uncured sheet rubber to temporarily adhere to the backing at a plurality of closely spaced small areas to provide free intermediate areas, relieving the tension on the backing to permit the free areas of the sheet rubber to crinkle by the contraction of the backing, curing the sheet rubber, while attached to the backing, sufficiently to retain the crinkle when the sheet rubber is removed from the backing, and stripping the partially cured sheet rubber from the backing.

21. In the method of crinkling sheet rubber, the steps comprising stretching a resilient backing, causing superimposed layers of uncured sheet rubber to cohere to each other and temporarily adhere to the backing at a plurality of closely spaced small areas to provide free intermediate areas, relieving the tension on the backing to permit the free areas of the sheet rubber to crinkle by the contraction of the backing, curing the sheet rubber, while attached to the backing, sufficiently to retain the crinkle when the sheet rubber is removed from the backing, and removing the crinkled sheet rubber from the backing.

JAMES J. GALLIGAN.
WILLIAM J. ROBINSON.